US007258889B2

(12) United States Patent
Delgado Araujo

(10) Patent No.: US 7,258,889 B2
(45) Date of Patent: Aug. 21, 2007

(54) METHOD FOR PREPARING A BEANLESS-FLAVOR SOYMILK AND/OR OKARA USING CARBON DIOXIDE IN A STATE OF SUBLIMATION

(75) Inventor: Alejandro Javier Delgado Araujo, Rios 1540y Antepara, San Blas, Quito (EC)

(73) Assignee: Alejandro Javier Delgado Araujo, San Blas, Quito (EC)

( * ) Notice: Subject to any disclaimer, the term of this patent is extended or adjusted under 35 U.S.C. 154(b) by 0 days.

(21) Appl. No.: 10/944,877

(22) Filed: Sep. 21, 2004

(65) Prior Publication Data

US 2006/0062890 A1    Mar. 23, 2006

(51) Int. Cl.
*A23L 1/20* (2006.01)

(52) U.S. Cl. .................. 426/634; 426/474; 426/475

(58) Field of Classification Search ............. 426/634, 426/475, 474
See application file for complete search history.

(56) References Cited

U.S. PATENT DOCUMENTS

| | | | | |
|---|---|---|---|---|
| 2,525,991 | A | * 10/1950 | Wydler | ................. 73/242 |
| 3,126,286 | A | * 3/1964 | Moshy | ................. 426/634 |
| 3,168,406 | A | * 2/1965 | Moshy | ................. 426/254 |
| 3,563,762 | A | * 2/1971 | Lo | ................. 426/311 |
| 4,241,100 | A | 12/1980 | Yutaka et al. | |
| 4,369,198 | A | * 1/1983 | Uchi et al. | ................. 426/271 |
| 4,409,256 | A | * 10/1983 | Johnson et al. | ................. 426/598 |
| 4,493,854 | A | 1/1985 | Friedrich et al. | |
| 4,828,869 | A | * 5/1989 | Doi et al. | ................. 426/656 |
| 4,855,159 | A | * 8/1989 | Takao et al. | ................. 426/656 |
| 4,915,972 | A | 4/1990 | Gupta et al. | |
| 5,217,621 | A | * 6/1993 | Norris | ................. 210/743 |
| 2004/0018294 | A1 | 1/2004 | Tomasula | |

FOREIGN PATENT DOCUMENTS

JP     157-94264      * 6/1982
JP     62 166852  A     1/1988

OTHER PUBLICATIONS

Che Man Y.B. et al.: "Acid Inactivation of Soybean Lipoxygenase With Retention of Protein Solubility" Journal of Food Science, Institute of Food Technologists, Chicago, IL, US, vol. 54, No. 4, Jul. 1, 1989, pp. 963-967, XP000048766 ISSN: 0022-1147 the whole document.
Partial International Search Report.

* cited by examiner

*Primary Examiner*—Anthony Weier
(74) *Attorney, Agent, or Firm*—Mechant & Gould

(57) ABSTRACT

A process for preparing a beanless flavor soymilk or okara or a combination thereof, which compares the stages of containing soybeans with deaerated water under an atmosphere of carbon dioxide for a time and a temperature effective to allow said soybeans to soak and swell; washing said soaked and swollen soybeans with water to remove oligosaccharides and ripening enzymes; grinding said washed soybeans under an at atmosphere of carbon dioxide by bubbling in carbon dioxide in a sublimated state to form a slurry; and filtering the slurry to produce raw okara and soymilk.

21 Claims, 1 Drawing Sheet

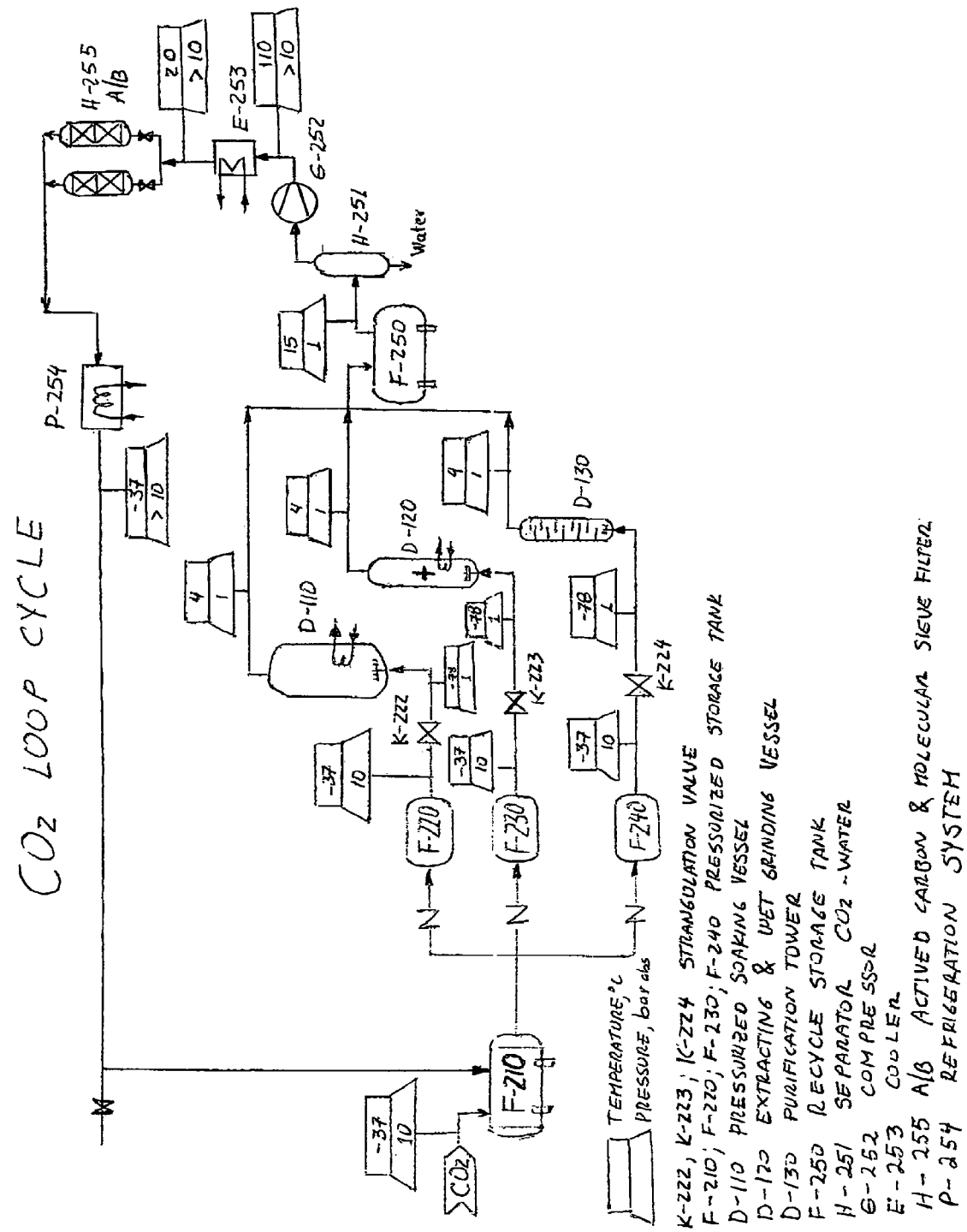

METHOD FOR PREPARING A BEANLESS-FLAVOR SOYMILK AND/OR OKARA USING CARBON DIOXIDE IN A STATE OF SUBLIMATION

BACKGROUND OF THE INVENTION

1. Field of the Invention

The present invention relates to a process for preparing a beanless flavor soymilk and/or okara using carbon dioxide in a state of sublimation, which avoids both chemical and thermal processing.

2. Description of the Background

For about 5,000 years soybeans and soybean products have been consumed in East Asia. A principal soybean product is soymilk, the traditional method of production of which has been to soak the beans overnight followed by washing and grinding with a specific quantity of water and then filtering the slurry product to obtain raw soymilk and the residue known as okara. The raw soymilk is then cooked for about 30 minutes and left to cool, and is then ready for consumption. Though soymilk obtained by this method has a high level of protein, it has strong beany odor and flavor; a characteristic that East Asian people are accustomed to but Westerners are not.

Despite these perceived odor and flavor problems, demand for soybean products both for human and animal consumption has greatly increased in the North American and European markets over the past 50 years, resulting in a major and modern soybean production and processing industry on both continents. According to Soya Technology Systems (1987), overall soy oil crushing accounts for 75% of world soybean consumption, which is divided between oil production (13%), animal feed (52%), food proteins (2%), plus a loss of about 8%.

Some commercial existing production processes do not include soaking as it is thought that soaking produces the beany odor and flavor that is difficult to eliminate (See U.S. Pat. No. 4,409,256.). While, some processes have been developed without using a soaking stage. A thermal treatment is mainly used in these processes to deactivate lipoxygenase, however, this has not widely used because of the low protein yield therefrom.

One approach to overcoming the problem of beany flavor has been to eliminate oxygen from the aqueous medium, as oxygen is required for undesirable lipid reactions, which are catalyzed by lipoxygenase. Some examples of these deaeration technologies and methodologies are disclosed in U.S. Pat. Nos. 4,369,198; 4,744,524; and 6,688,214.

In more detail, U.S. Pat. No. 4,369,198 describes a method for extracting ingredients of oil-containing seeds, and principally involves soybean in which soybeans are inactivated using deaerated water in an oxygen-free atmosphere. The product affords a protein yield of only 63% and the beany flavor is not completely removed.

U.S. Pat. No. 4,744,524 describes equipment for making non-beany flavor soymilk with an improvement in the deaeration system.

This patent also describes the known problem of "off-flavors" arising from the production of seed oils generally. Notably, it is well known that certain enzymes present in the soybeans and many other seeds are the major causes of off-flavor arising upon processing these seeds for foods.

Further, U.S. Pat. No. 4,744,524 describes that polyunsaturated fatty acids are catalytically oxidized by the enzymes in the presence of water and oxygen to produce hydroperoxides which finally yield the off-flavor causing volatiles. Lipoxygenase, distributed throughout the soybean cotyledons, becomes active as soon as their cell structure is broken. Therefore, the control of off-flavor has traditionally been done by inactivating the enzyme, such as by heating and/or altering pH treatments has been that tend to insolublize the soybean protein and thereby reduce soymilk yield and make it chalky in mouthfeel. The degree of enzyme inactivation required to reduce the off-flavors to acceptable level leads to an unacceptably low protein solubility. An approach of tacking the problem is to only partially inactive the enzyme, remove most remaining off-flavors by deodorization, and make any residual off-flavor by flavoring. In another approach, the enzyme is totally inactivated prior to disintegrating the beans, and the resulting insoluble soybean protein is dispersed in water by fine grinding and high pressure homogenizing. Yet another approach has been to inactivate the enzyme partially by grinding the beans in hot, pH controlled aqueous under limiting oxygen condition. Existing method of making no-beany flavor soymilk re based on the above approaches or a combination of these.

Only recently was it recognized and demonstrated that it is totally unnecessary to inactivate the enzyme, prior to or during the disintegration of soybeans, if said disintegration is carried out in an oxygen-free environment.

U.S. Pat. No. 6,688,214 describes a method for processing soybean products and an apparatus for thermal deaeration of soybean slurry. The deaeration method is combined with a thermal process to deactivate the enzymes. However, due to the fact that soybean slurry is a system of water and solids, the removal of air bubbles is extremely difficult, and it is necessary to perform the deaeration using a strong suction provided by a structurally-complicated apparatus, although air bubbles are not completely eliminated.

Further, according to U.S. Pat. No. 6,688,214, after the heating step is completed, the soybean slurry absorbs odor already generated in the soybean protein in which the thermal de-naturation is well advanced and this odor becomes fixed in the soybean slurry. This odor remains in the soybean slurry even if air bubbles are removed from the slurry that has undergone the heating step.

In the above patents, the main objective is the improvement of either apparati or methods to deaerate an aqueous-solid system, yet oxygen elimination is not achieved to a satisfactory extent. Furthermore, the apparati used are complex and consume a prohibitive amount of energy.

Another approach to overcoming the problem of beany flavor has been the use of a heat treatment to destroy lipoxygenase and the other undesirable enzymes. Although heat is effective in destroying such enzymes, these processes also decrease the protein yield because of thermal protein denaturation. U.S. Pat. No. 4,409,256 describes a thermal process to deactive enzymes from whole soybean with a yield as high as 70%, which addresses this problem to an extent.

Yet a further approach to overcoming the problem of beany flavor has been the use of chemicals, mainly for inactivating lipoxygenase. Sodium bicarbonate is used in the blanching stage, using an amount between 0.05 and 0.2% by weight. Blanching is a chemical process in which the chemical, in this instance sodium bicarbonate, reacts with and destroys enzymes. Blanching is not only used in soymilk but also in other soy products such as protein concentrates, etc. Despite its popularity, blanching is not efficient because the milk or intermediate products formed require a post-deodorization stage in most instances. However, to date no new blanching methods have been developed.

Additional processes have been developed to obtain soy products, such as soymilk, protein concentrates, insolates, and soy oil, of which some are thermal and others are chemical or a mixture of both.

Some of the conventional processes using chemicals or thermal de-activation are described below.

For example, U.S. Pat. No. 4,042,187 describes the use of a chemical (sodium bicarbonate) and thermal treatment.

U.S. Pat. No. 4,138,506 discloses some chemicals (potassium sulfite, sodium hydroxide, etc.).

U.S. Pat. No. 4,409,256 teaches a thermal de-activation of the lypoxygenase.

U.S. Pat. No. 4,744,524 employs a chemical (sodium bicarbonate) for blanching.

U.S. Pat. No. 4,915,972 employs a chemical (sodium bicarbonate) for blanching, sodium bicarbonate produces an alkali medium.

U.S. Pat. No. 5,945,151 teaches a soaking stage and vacuum cooking, which is advantageous in producing a less unpleasant soybean taste.

U.S. Pat. No. 6,316,043 describes the use of chemicals, a solidifying agent, and an acid medium, as well as a thermal stage direct high-temperature flash heating using steam, in which the soymilk needs to be homogenized.

U.S. Pat. No. 6,322,846 discloses a sophisticated mill, wherein the particles are between 10 microns and 100 microns, processed at high pressure (7000–12000 psi) using chemicals and enzymes.

U.S. Pat. No. 6,451,359 describes a complex process wherein enzymes are used to hydrolyze the proteins at high temperatures, and also uses sweeteners, flavoring, and solubilization acids.

U.S. Pat. No. 6,688,214 discloses the use of thermal, denaturation and vacuum deaeration stages but the results are unsatisfactory.

U.S. Pat. No. 4,493,854 discloses the use of supercritical carbon dioxide to extract lipids from the soybean and teaches that carbon dioxide deactivates lypoxygenase. Although this process is suitable, the extreme conditions used are problematic where the minimum pressure is 690 atm and temperature is 81° C.

Supercritical carbon dioxide is also used to extract soy oil from raw soybeans. This soy oil has acceptable levels of purpose of human consumption without significant degradation of the nutritional properties, according to U.S. Pat. No. 4,493,854. The processing conditions described are a pressure range between 793 to 855 bar and a temperature range between 81° C. and 100° C. The use of heavy-duty equipment is also required.

U.S. Pat. No. 4,495,207 discloses the use of supercritical carbon dioxide to improve defating dry-milled corm germ. Traditionally, byproducts thereof have been used as animal feed due to the problem of its bad flavor. The principal problem in developing corn germ as a finished vegetable protein product for human consumption relates to product deterioration during shipment, distribution and extended periods of storage.

Conventional pressing and solvent extraction methods using hexane or similar hydrocarbons leave lipids in the flour which either auto- or enzymatically oxidize into compounds, which contribute to grassy/beany and bitter flavors.

The commercially produced, solvent-extracted, corn germ flour taught by Canoltry et al. [J. Food Sci. 42: 269(1977)], for example, contains a residual oil content of 2%. The result is an eventual and inevitable reduction in the product's organoleptic and nutritional qualities. See U.S. Pat. No. 4,495,207.

It is known that instability is relates to chalky mouthfeel which is caused by the cellulosic proteinaceous and carbohydrate constituents of the soybean. This is why commercial enzymes are used to denature the substances that produce the chalky mouthfeel and to improve the final texture of the product.

Not surprisingly, there have been more recent attempts to produce stabilized soy beverages with improved texture and taste. U.S. Pat. Nos. 6,322,846 and 6,451,359 use high pressure, chemicals, and enzymes, for example. These processes are highly industrial and complex.

Carbon dioxide is used in food processing technology. Perhaps, the best known use is decaffeination of coffee using supercritical carbon dioxide as a supercritical fluid extractor. Supercritical carbon dioxide is considered to be ideal because it is non-toxic, non-explosive, inexpensive, readily available, and easily removed from the extract product. Other traditional uses are in beverage carbonation and food presentation and storage.

The use of supercritical conditions is a problem however, because it requires heavy duty cooling equipment, with pressure being supplied by large centrifuges.

Also, a coffee decaffeination process is known that uses liquid carbon dioxide. The range of pressure used is 20 bar to about 400 bar and the temperature range is between 10° C. and about 100° C. See U.S. Pat. No. 4,472,442.

However, a need remains for a process for preparing a beanless flavor soymilk and/or okara without using thermal steps which tend to reduce protein yield and without using complex individual equipment.

A seed also remains for a process for preparing seed oils without producing off-flavors.

BRIEF DESCRIPTION OF THE DRAWING

The drawing illustrates a $CO_2$ loop cycle used in accordance with the present invention.

DETAILED DESCRIPTION OF THE PREFERRED EMBODIMENTS

In accordance with one aspect of the present invention, a process is provided for eliminating the beany flavor from soybeans in the production of products, such as soymilk and okara which avoids the disadvantages of conventional process, which include thermal and/or chemical processing stages.

In accordance with another aspect of the present invention, a process is provided for the extraction of oils from seeds, preferably edible oils.

The present invention is also based in part on the discovery that beany flavors and odors from soybean may be eliminated during the production of soy products, such a soymilk and okara.

The present invention is based in part on the discovery that seed oils may be produced without off-flavors in the same manner.

In more detail, the present invention provides a process for producing soymilk and/or okara which entails first subjecting whole soybeans to a cooled, pressured carbon dioxide in which the soaking water is deaerated. That is, a deaerated water is used for soaking the whole soybeans and sublimated carbon dioxide is sparged into the deaerated water. Then, the soaking soybeans are subjected to grinding with deaerated water through which a stream of sublimated carbon dioxide bubbles pass to thereby eliminate a bad or beany flavor, and the ground beans, as slurry, are filtered. Then, the filtered slurry is purified using carbon dioxide under the same conditions as in the grinding (or second) stage-except that a lower minimum flux ratio may be used-in order to eliminate any remaining bad flavors and odors from the raw soymilk base, which is then cooked.

The soymilk produced by the present invention has no beany flavor, no bitter taste and no chalkiness.

Further, the present process, being non-thermal, does not destroy essential amino acids.

Additionally, the soymilk produced is white due to reduce chemical browning, and moreover, has a similar flavor to dairy milk and is highly stable. The okara produced has minimal if any, bad odors and, moreover, a high fat content as all process stages of soaking, grinding and purifying are carried out at low temperature.

The present invention actually realizes two main objectives: first, the attainment of both high protein yields and virtually no beany flavor and odor. Second, these objects are realized in a manner such that the obtained products are both economically feasible and environmentally safe.

The process of the present invention employs the use of whole soybeans, and does not require the use de-hulled soybeans. This is important because broken soybeans, even though the soybean coating remains intact, can produce undesirable substances at low levels of humidity and temperature, such as ketones, aldehydes, etc., which affect the organoleptic qualities of the end-product (See U.S. Pat. No. 4,409,256.).

In the present process, the whole soybeans are soaked in deaerated water with sublimated carbon dioxide being sparged into the water. This may be achieved by a gas conduit having an effluent part or opening below the surface of the deaerated water in a soaking container.

Generally, it is most preferred to use a carbon dioxide pressure of about 1–5 bar absolute and a soaking water temperature of about 4° C. The soaking under these conditions may either be a "static" soaking—with no movement in the tank or chamber for soaking—or a "dynamic" soaking—using an agitation. The agitation may be provided by any stirring device. The soaking stage is effected either continuously or by batch, that preferably batchwise.

Further, a membrane contactor may be used to enhance the carborating efficiency in the soaking stage.

While a carbon dioxide pressure of 1–4 bar absolute is used, it is preferably that about 2.5 to 5 bar be used, and most preferably about 3–4.5 bar absolute.

Generally, the pH of the deaerated water in the soaking stage is in the range of from less than 5.8 to greater than 4.6. However, the soybean-deaerated water- carbon dioxide system should never reach a pH of 4.2–4.6, which is the isoeletric region for soybean proteins. Thus, preferably the pH should be from about 4.7 or 4.8 to about 5.8, i.e. higher than the isoelectric region for soybean proteins.

As noted above, carbon dioxide has been found to be effective in extracting beany flavors and odors from soybeans. Additionally, the used of carbon dioxide provides a mildly acid medium which does not leave remaining substances, such as organic (other than carbonic acid) and/or inorganic acids in the medium. Thus, products and by-products of the present invention are chemical-free, i.e. free of chemical additives. Thus, as used herein the term "chemical free" means free of—or containing no chemical additives or chemical processing aids, such as sodium bicarbonate.

Then, the soybeans are washed with ordinary tap water and soaked with deaerated water for about 6 to 18 hours, preferably about 8 to 14 hours, and most preferably about 12 hours at about 1–5 bar absolute of pressure and about 0 to 10° C., and preferably about 2 to 8° C., most preferably about 4° C., using an atmosphere of carbon dioxide. Preferably, about 2.5 to 5 bar, and most preferably 3–4 bar absolute of pressure in used. Importantly, the present invention has been based, in part, up on the discovery that carbon dioxide contributes to the dissolution of proteolytic enzymes due to the soaking acid medium, which causes the breaking of proteins in the soaked soybean, and moreover retards non-desirable enzymatic processes.

As used herein, the term "deaerated" means water which has the dissolved air including oxygen removed therefrom. For purposes of the present invention, any conventional methodology may be used to prepare deaerated water. For example, deaerated water may be industrially produced by the use of scrubbing deaeration systems, vacuum deaeration systems and even a vacuum filtration or inert gas methodologies in the laboratory. See Dissolution Technologies, "Comparison of the Effectiveness of Various Deaeration Techniques", Degenhardt, O. et al., February 2004. According to this article, a helium gas sparge methodology affords, perhaps, the best results. See also USP (2002). Generally, it is preferred that the deaerated water used have a dissolved oxygen content of less than 10 ppm, preferably less than 5 ppm.

The carbon dioxide is then bubble through in the soaking step into the deaerated water. This sublimated gas will have a temperature of about −78° C., and will be at an extra-atmospheric pressure of up to about 10 bar absolute pressure. A carbon dioxide loop cycle which is typically used in the present invention is depicted in FIG. 1.

FIG. 1 depicts a suitable $CO_2$ loop cycle which may be used in the present invention. The overall loop cycle entails the inclusion of the components shown in fluid and operable connection are: strangulation values ( K-222, K-223, and K-224), pressurized storage tanks (F-210, F-220, F-230, and F-240), pressurized soaking vessel (D-110), extracting and wet grinding vessel (D-120), purification tower (D-130), recycle storage tank (F-250), separator $CO_2$-water (H-251), compressor (G-252), cooler (E-253), activated carbon and molecular sieve filters (H-255 A/B), and refrigeration system (P-254).

A Soymilk Plant

The following is a more detailed description of a soymilk processing plant with a production of 10,000 liters of soymilk per 8-hour day, equivalent to 1,250 liters per hour or a mass flow of 1,269 kg of soymilk per hour (density=1.015 grams per milliliter).

Basic Mass and Heat Balance

The required soy bean mass flow is 292 kg of soy beans per hour (at 13% humidity and 65% process yield).

Water requirement for producing soymilk is 1,698 kg/hour (including process yield).

Deaerated water absorbed in soaking is 277 kg/hour.

Deaerated water added during grinding is 1,421 kg/hour.

During the static soaking stage consumption of deaerated water is 1,750 kg/hour, in which the replaced soaking water is equal to the water absorbed during soaking, equivalent to 277 kg/hour.

Total consumption of deaerated water is 3,171 kg/hour.

Total washing water is approximately 2,920 kg/hour.

During an 8-hour soaking period the batch volume is 14 m³.

Carbon dioxide consumption during soaking is 108 kg per batch (at a pressure of 4 atmospheres, 4° C. solubility is 0.263 mole $CO_2$ per liters of water).

Carbon dioxide consumption during the grinding stage is 267 kg/hour and $CO_2$ consumption during purification is 73.88 kg/hour.

Total mass flow of $CO_2$ is 354 kg/hour.

4,253 kg of $CO_2$ are required for one and a half days (12 hours) of production.

For a total mass flow $CO_2$ of 354 kg/hour a 25 hp compressor working within a range of 1 to 18 atmospheres in a loop cycle is required.

The compressed $CO_2$ reaches a temperature of 110° C., which needs to be cooled down to 20° C. using a cooler, with a heat elimination of 29,800 kJ/hour.

In order to be liquidized the $CO_2$ should be cooled to a temperature of −37° C. if the pressure is at 10 atmospheres the heat elimination will be 57,420 kJ/hour.

Heat elimination from the soaking water is 81,200 kJ/hour to reach a temperature of 4° C.

Features of Soymilk Plant Elements with Reference to the Drawing

In the main storage tank (F-210) the $CO_2$ is in a liquid state of 4,253 kg. the tank is connected to three secondary storage tanks (F-220, F-230, and F-240) by stainless steel AISI 304 (food grade) piping. The conditions of the $CO_2$ in the main tank and secondary tanks are approximately the same (−37° C. and 10 atmospheres). The flow of the liquid $CO_2$ from the main tank to the secondary tanks is carried out by stainless steel pumps. The $CO_2$ is then set and distributed from the secondary tanks to where it is required in other stages.

The whole soybeans are introduced using any type of conveyor, which could be from the silo using a worm (screw conveyor) to the soaking vessel (D-110), in which the beans are washed with tap water using an agitation system that can be a mechanical agitator from which air has been extracted using a normal vacuum system.

The F-220 tank feeds the soaking recipient, reaching an internal pressure of 4 atmospheres. Soaking time is 8 hours. Then the soaking tank is depressurized and all the $CO_2$ is sent to the recycling storage tank (F-250) and the soaked soybeans are then washed again.

All the liquid $CO_2$ storage tanks are thermally insulated with commercial units that use polyurethane or vacuum system.

From the F-230 tank the liquid $CO_2$ is transferred to the grinding container and extracted by a pump with a mass flow of 267 kg/ hour that produces a change of state from 10 atmospheres at −37° C. to >1 atmosphere at approximately −78° C. using a distributor which changes the isenthalpic state. The $CO_2$ is bubbled by the distributor under a slightly greater pressure in order to ensure mass transfer and an adequate residence time while the soaked soybeans and the grinding water are fed continuously within the container where the soybeans are ground using some type of mechanical device and the used $CO_2$ is also extracted continuously through the top of the vessel, whereby the beany soy odors are extracted from the slurry being grounded (soybean, $CO_2$ and water).

During the grinding stage the $CO_2$ in the stage of sublimation is bubbled and mixed with the ground slurry (water and soybean), in which the $CO_2$ absorbs the medium's (no phase change) heat as it passes to the gas state. This results in internal cooling down to 4° C. and so external refrigeration is not necessary.

The $CO_2$ gas also contains traces if water and is stored or enters the recycling storage tank where it is fed to the compressor (G-252) after the water from this flow has been extracted using a separator (H-251). During food-grade stainless steel reciprocating pump with a volumetric flow or capacity of 1,250 liters per hour (21 liters per minute), whose pumping discharge pressure should be such as to ensure the separation of the okara from the raw soymilk extract though filtering using a rotary vacuum filter. A pump is used to feed the extract from the purification tower (D-130) with a mass flow of 1.269 kg/hour. The tower has a distributor through which the $CO_2$ is fed in the sublimation state in the same way as in the grinding stage with a mass flow of 73.88 kg/hour. Internally, the tower can use various types of packing such as rasching ring, slotted ring, and cross partition rings or perforated plates to significantly increase the transfer of the mass. In this way the last traces of unwanted substances in the raw soymilk are eliminated. The purification tower works continuously in which the temperature should be 4° C. with an internal pressure of 1 atmosphere (the container is thermally insulated and has a refrigerated system that keeps temperatures at 4° C.). The used $CO_2$ leaves through the head/top of the tower and goes to the recycling storage tank from where it goes on to the closed cycle. The purified extract leaves from the bottom of the tower and is pumped to cooking tank in which the soy's non-nutritional substances are destroyed. The cooking tank has an agitation system and a heating system usually using a steam jacket. The soymilk is then pasteurized and sterilized using any of the commercial means available such as plate pasteurizer and/or UHT sterilizer.

All the water used in the process can be recycled by installing a water treatment plant for this purpose, depending on budgetary considerations. It should be noted that the plant's final design will depend mainly on the process's economic factors, such as $CO_2$ and electricity consumption for liquefying refrigeration, etc.

The $CO_2$ atmosphere should produce a pH of less than about 6.5 preferably less than about 6.0, and most preferably about 5.8 within the soaking chamber and medium, which is deaerated water.

It is known that the solubility of soybean proteins in water is strongly affected by pH. Close to 80% of the protein in raw seeds or unheated meal can be extracted at neutral or alkaline pH (See Berk; Zeki. Technology of Production No. 97, 1992. p.8). However, the present process uses a weak acid medium without the risk that soybean-water—$CO_2$ system will ever reach a pH 4.2 to 4.6 where the isoelectric region resides and where protein precipitation is imminent.

After the soaking stage of the present process, the swelled soybeans weigh about twice their original weight. They are washed again with ordinary water to eliminate oligosaccharides, and ripening enzymes. It is believed that the use of carbon dioxide helps to dissolved oligosaccharides in the aqueous soaking medium. Oligosaccharides are part of the soybean carbohydrates. According to the conventional wisdom, oligosaccharides are not broken down by the enzymes of the digestive tract but are fermented by microorganisms present in the intestine with the formation of intestinal gas, i.e. flatulence, an inconvenience associated with the ingestion of beans in general. This is a factor which the present invention takes into account (Berk; Zeki. Technology of Production of Edible Fours and Protein Products from Soybeans, FAO Agricultural Service Bulletin No. 97, 1992. p. 12).

The wet soybeans and the deaerated water are fed into a carbon dioxide atmospheric grinding stage. The saturated carbon dioxide is bubbled in a sublimated (solid) state at a temperature of −78° C., while the water-soybean system is at about atmospheric pressure, a temperature of preferably 4° C., and pH is 5.8.

In the grinding stage, a minimum flux ratio of 0.15 ($CO_2$ gas/grinding liquid ratio) is used. In this invention, it has been surprisingly discovered that saturated carbon dioxide in the above-mentioned sublimated state easily extracts undesirable substances such as beany flavor, odor and enzymes from the slurry without adversely affecting other organoleptic qualities thereof.

In a following stage, the slurry is filtered and raw okara and soymilk are obtained. Both intermediate products present a minimal bad odor and whitefish color. It should be noted that chemical browning is indicative of protein and amino acid destruction (U.S. Pat. No. 4,409,256).

In accordance with the present invention it is believed that some enzymes from soybean catalyze chemical browning, which can be minimized by soaking and the above-mentioned extraction stage, thus the soaking stage is as important as the extraction stages in the present invention.

The soymilk produced by the present process does not present a chalky mouthfeel due to oligosaccharides. Other insoluble substances such as protein of high molecular weight and cellulose are easily separated by both soaking and filtration and as a result all fiber is eliminated from the raw soymilk.

Two consequences of soybean processing at a low temperature may be noted. First, okara yields a high level of lipids (87.19%) of the whole soybean or a content of 18% of its total solids, while total soymilk solids contain just 1.33% of lipids. Thus, this product can be called de-fated soymilk or light soymilk. Additionally, light soy oil can be extracted from okara, thus the present invention increases the raw soybean resource with little waste. It should be noted that the ash yield regarding the total soybean solids is only 16%, which is a favorable factor in obtaining soy oil accordingly to U.S. Pat. No. 5,278,325. Secondly, raw soymilk extract yields a high level of protein of at least 75% of the whole soybean (less water). Further, because these stages are carried out at low temperatures there is no denaturation of proteins caused by heating.

The raw soymilk extract is then purified to ensure the quality of the end product using the same conditions of saturated carbon dioxide which is bubbled in a sublimated state at a temperature of −78° C. at atmospheric pressure inside the purification tower at most preferably 4° C. and a pH of 5.8. The flux ratio is lower than in the grinding stage because most of the undesirable substances have already been eliminated. In the purification stage the minimum flux ratio is 0.043 ($CO_2$ gas/raw soymilk liquid ratio).

The raw soymilk is then cooked for about 15 to 60, preferably about 30 minutes, at atmospheric pressure to eliminate anti-nutritional factors, such as trypsin inhibitor substances, and to lightly deodorize the remaining bad odors, after which it passes through a pasteurization or sterilization stage and is then cooled to about 2 to 8° C., preferably about 4° C., ready for packing. This process does not require vacuum deodorization and homogenization.

In industrial use of the present invention, the carbon dioxide can be recycled but beforehand it should be purified using an activated carbon filter and a molecular sieve to eliminate undesirable substances. The $CO_2$ is then fed back to be used again for the next soaking, grinding and purification stages, known as a loop cycle. Moreover, the $CO_2$ loop cycle operates under soft conditions such as a maximum pressure of 10 bar absolute and a minimum temperature of −78° C.

Okara can be dried using any suitable chemical engineering method for subsequent processing.

Further, the present process can be conducted either batch wise or continuously.

The soymilk has a yield of at least 73.14% of the usable soybean (less fiber and water) or 65% of the whole soybean (less water).

The soymilk can be used to make excellent soy-products such as yogurt, ice cream, tofu, etc. It may also be used as an intermediate product to produce protein concentrates. Further, product work-up is now described.

Depending on the condition of the invention's process pure soy extract or soymilk can be obtained. The soy milk or a protein extract obtained from the invention's process (the raw material) passes through an acidification stage in the iso-electric region in which the protein precipitation is produced as in cheese making. In the so-called acid wash any food grade acid, such as citric acid, can be used. It is also believed that the $CO_2$ can be used in a sublimation state, preferably in similar condition with the help of latest-generation contactors. All this leads to pH in the iso-electric region (4.2–4.6) where precipitation is imminent. Thus two products are obtained: (1) precipitated protein in higher concentration known as soy curd and (2) soy whey that contains carbohydrates and slats in greater quantities.

Separating these two flows/fluids are carried out by centrifugation or filtration, whichever is most suitable. The curd then goes through a de-acidification stage in which the suspension is recovered by pH variation. This is relatively easy as a neutralization agent (alkali) is not needed in order to go back to the initial pH given that if one works with $CO_2$ acidity is simply eliminated by de-pressurization and/or vacuum in which the extracted $CO_2$ gas can go to a recycle tank. Then, after being purified with an activated carbon filter, it is fed back into the new acid washing stage. The stable suspension of protein should have a solid concentration of at least 30%. After this stage the suspension again goes through a centrifugation stage in which the extract is concentrated to 75% protein. Finally, the protein extract is dried by spray drying to obtain protein powder with a maximum humidity of 8% so as not to undergo deterioration during storage.

Some stages of this process can be adapted or developed to improve other already known processes such as soy oil processing. These adaptations can replace the balancing stage or stages (using sodium bicarbonate or other chemicals) with other extraction stage that use carbon dioxide, which have advantages such as, minimizing bad odors and flavors, and improved yields.

Additionally, as noted above, the present invention may be used to produce seed oil. Any seeds, particularly edible seeds or nuts, such as sunflower seeds, walnuts, peanuts, pecans, may be used to produce oils having reduced or eliminated off-flavors. Generally, the apparatus of the present invention may be used to produce the seed oils, and the released oils may be separated by extraction from the aqueous medium by a suitable solvent such as hexane, with the solvent being removed by subsequent distillation and vacuum treatment if desired.

The present process overcomes the principal above-mentioned problems found in traditional soymilk, and some modern commercial soymilks such as beany odor and flavor, chalky mouthfeel, chemical browning, instability, low protein yields, flatulence, and the soymilk is chemical free.

Moreover, the soymilk produced by the present invention has a similar appearance to dairy soymilk.

Also, it has a very similar mouthfeel to dairy soymilk.

The present process or part of it may be used to produce protein concentrates.

Further, some stages of this process may be used to improve known processes already known such as soy oil process, protein isolates, etc.

Importantly, the products do not contain bean flavor.

Carbon Dioxide Atmospheric Wet Grinding Extraction and Carbon Dioxide Atmospheric Purification.

The object is the extraction or elimination of lypoxygenase and other enzymes which cause bad taste flavors from the soybean by sublimated carbon dioxide.

These enzymes in the bean cause a bitter, chalky flavor in the end product. Use of carbon dioxide also eliminates chemical browning substances, which are both volatile and non-volatile substances.

Process Advantages (1) Little resident time.

(2) Continuous process.

(3) Soft process conditions.

(4) As these stages are carried out at a low extracting temperature (4° C.), the end product (soymilk) has a very low percentage of fat (0.08%). As used herein, therefore, the phrase "low fat" means less than 0.10% fat by weight based on the total weight of the products soymilk.

Product and Byproduct Advantages (1) Total or almost total non-desirable substances are eliminated from the soybean (milk and okara).

(2) This soymilk has a highly enhances flavor and palatability.

(3) It does not require any chemical processing; it does not require a chemical balancing stage.

(4) The soymilk has a yield of at least 73.14 % of the usable soybean (less fiber).

(5) Is this process thermal enzyme de-activation is not done.

Process Stage: Carbon Dioxide Pressured Cool Soaking

The objective is the solubilization of proteolytic enzymes in an acidic medium or environment.

Proteolytic enzymes causes the destruction (proteolysis) of protein in the soybean.

Carbon dioxide hydrolyzes some carbohydrates and retards non-desirable enzymation processes.

Advantages of this Step (1) This step improves the yield of the soymilk.

(2) All the water added to the soy is deaerated.

(3) The soaking water extracts most of the flatulence-causing oligosaccharides.

(4) Oligosaccharides are dissolved in the soaking water.

(5) Oligosaccharides produce the chalky texture.

(6) The soymilk base can be used making excellent beverages, yogurt, ice cream, tofu, etc.

(7) $CO_2$ is more soluble than $O_2$ and helps to eliminate the $O_2$, which is in the aqueous medium.

(8) This process does not need a vacuum deodorization stage.

(9) This process does not need a homogenization stage due to the soymilk being highly stable and with good properties.

(10) The soymilk can be used as intermediate product.

(11) The soymilk can does contain any fiber.

As used herein, the term "bean flavor" means that the products or byproducts of the present invention have no perceptible bean flavor on the human palate.

Having describes the present invention, reference will now be made to an example, which is provided solely for purposes of illustration and is not intended to be limitative.

EXAMPLE

A procedure used to process whole soybeans was as follows:
1. Sort approximately 100 g of whole soybeans,
2. Weight 100 g of whole soybeans (12% humidity),
3. Wash strongly with tap water,
4. Introduce the whole soybeans in a plastic bottle (2 liters of capacity),
5. Put in the bottle 17 grams of dry ice in pieces,
6. Put in the bottle 0.5 liters of boiled water (temp=20° C. approx.) instead of deaerated water,
7. Close the bottle quickly,
8. The bottle put in the fridge (t=4° C.) the soaking step is made overnight and the pressure must reach to 4 atmospheres approximately,
9. The next day depressurize the bottle,
10. Wash the wet and swelled soybeans strongly with tap water,
11. Soaked soybeans put in the blender cup,
12. Put 0.6 liters of boiled water (t=20° C.),
13. While the mixture soybeans and water are blended, 91 grams of dry ice in pieces are introduced in the blender cup (blending time=5 minutes approx.),
14. The slurry is filtered using a fabric bag filter, raw soymilk extract and okara are separated,
15. Raw soymilk extract goes to the purification step. Put the extract in the same blender that has already been washed. While the extract is blended again, 27 grams of dry ice in pieces are introduced in the blender cup (time=2 minutes approx.),
16. The purified raw soymilk is filtered again and cooked for 35 minutes (20 minutes of batch pasteurization), and
17. Cool at 4° C.

MASS BALANCE OF THE PRESENT PROCESS

| Component | % by Weight Soymilk | % by Weight Okara | Soymilk Yield | Okara Yield |
|---|---|---|---|---|
| Protein | 50.16 | 32.74 | 75.01 | 24.99 |
| Lipids | 1.33 | 17.47 | 12.98 | 87.02 |
| Ash | 5.65 | 2.2 | 83.42 | 16.58 |
| Fiber | 0 | 42.23 | 0 | 100 |
| Carbohydrates | 42.86 | 5.36 | 94 | 6 |

As noted from the above Table relating to Mass Balance, the present process affords soymilk (or extract of protein 50.16% and carbohydrates 42.86%). The precise relative amounts will depend upon the amount of water used in the process.

Furthermore, if desired, soy oil can be extracted from the okara produced by the present process using any knowing commercial extraction method. However before extraction the okara must be dried to a suitable humidity of about 13–30% (water content).

Thus, the important end products of the present invention included soymilk or (protein and carbohydrate) extract, soy oil and fiber since as noted above, the present process may be further modified to include a conventional extraction step. Yet, most importantly, all products and by-products of the present invention do not exhibit either a beany flavor or odor.

As noted above, in accordance with yet another aspect of the present invention, seed oils, nut oils and even olive oil may be produced. As such, the present invention may be used to extract oil from seeds, particularly edible seeds with the use of the carbon dioxide atmosphere and conditions therewith described herein. However, in this process, an extraction step is used, after an initial wash/bath step, wherein the oil is extracted from the deaerated water with organic solvent. Finally, a distillation step is used if desired, vacuum purification may also be used.

For example, the sublimated carbon dioxide of the present invention may be used in conjunction with seeds such as sunflower seeds, flax seeds, rape seeds (canola), pumpkin seeds, safflower seeds, wheat germ seeds, grape seeds, corn seeds, cottonseed, peanuts, almonds, avocados, coconut, brazil nuts, pecans, pistachios, cashews, macadamias, and olives. The seeds are preferably dehulled in a conventional manner prior to the wash/bath/soak step in deaerated water/ sublimated carbon dioxide.

Generally, when using any type of seed, the seeds are first subjected to the soaking extraction step using sublimated carbon dioxide in deaerated water as described above. Then, the released oils are extracted from the deaerated water bath with a suitable organic solvent for the oil, which is preferably hydrophobic. Such solvents are well-known and include hexane, for example.

Processing Seed Oil

The lypoxigenase enzyme is recognized as the main producer of the majority of vegetable proteins in plants such as soybeans, peas and peanuts. Oily polysaturated acids are oxidized by lypoxigenase catalytic action and produce bad odors such as aldehides, alcohol, ketones furans, hydroxy-acids, etc.

Lypoxigenase is found in the cotydelons of legumes and many other seeds but the enzyme is inactive due to its limited contact with the oxygen in the substratum held in the cell's structure. The cell structure's break-up by grinding or milling leads to oxidization and so lypoxigenase needs to be inactivated in order to control bad flavors. The removal of bad odors in edible oils not only makes the refining process complex but also causes the oil to be degraded (see U.S. Pat. No. 4,915,972). One of the ways to avoid the negative effects of lypoxigenase is to use some the stages of this invention and adapt them to commercial methods.

In traditional process used to produce soy oil the main residue extract is used for animal feed without taking into account the commercial value of the non-oily by-products as it is difficult or almost impossible to process it profitably. It would be ideal to obtain other products such as protein concentrates for human consumption using this by-product because the commercial value of soy meal is higher than profits from the sale of an equal quantity of oil. However, there is an equal demand for both soy oil and meal and so the meals' quality and soy's make-up are important factors that need to be taken into account when choosing a processing method and the products one wants to obtain. New ways of processing soy can be found by using parts of the stages and/or the whole of this invention.

Obtaining Soy Oil from Okara

As mentioned above, raw okara has good organoleptical properties (it does not have a beany smell) as well as containing most of lipids from soybeans (yield is 87.19%). Also, as okara is processes under cool/cold conditions the oil content remains intact, and it is not degraded by heat or oxidization due to being processed in a $CO_2$ atmosphere. Starting with okara in raw state in which humidity should be 50% of total weight, and due to this being one of the conditions for ensuring good drying by spray drying, this can be achieved by varying the conditions in which water is fed into the invention's production process. Okara is then dried using this method to a maximum humidity of 10% of total weight. It is known that excessive humidity in the raw material can lead to problems such as its deterioration on one hand as well as difficulties of extracting oil because an emulsion would result that would be difficult to separate due to the presence of lecithin in the extract's medium. After the drying stage the okara is cooked usually live vapor at temperature between 90° C. and 120° C. approximately. Cooking in a humid atmosphere for de-naturalization of remaining proteins remaining in the okara and in some degree the coalescence of small droplets of oil. Following this stage flakes are produced with the main purpose of increasing the surface contact between the okara's texture which is mainly made up of 42.23% fibers. 32.74% proteins and 17.47% fats. The high fiber helps in extraction as this increases the interface area and creates higher porousness in the okara flakes because these structures help to diffuse the solvent as well as in percolation.

The soy flakes then go through a normal solvent extraction stage using a hexane (by batch, semi-continuous or continuous) to obtain two products: the okara waste (with a minimal quantity of fat) and the oil-rich soy solvent (full micelle). The following operations are aimed at removing and recuperating the solvent of each one of the streams. Most of solvent extraction manufactures also offer micelle distillation systems which minimize damage to the raw oil and its components, minimum loss of solvent as well as other important characteristics. Means of solvent vaporization include instant vaporation, vacuum distillation and steam stripping. On the other hand the used solvent is recovered from the okara waste using an okara desolventizer in this stage.

The resulting soy oil contains certain types of wax which are edible substances that are solid at temperatures below 40° C. Their presence give the oil a turbid character at low winter temperatures which is why they are eliminated during winterization where the raw oil is chilled at 0° C. and in this way the wax is crystallized to be easily eliminated from the oil.

After this stage the raw soy oil goes on to be de-gumming in which phospholipids are eliminated. As most of the enzymes have already been eliminated in the inventor's previous process it is believed that the carbon dioxide in the above-mentioned conditions have also eliminated certain enzymes that reduce the phospholipids' hydrability and in this way, the efficiency of the de-gumming is improved.

The soy oil then goes through a neutralization stage in which the free oil acids in the oil are eliminated using an alkali, which may be any suitable inorganic base such as alkali carbonates or hydroxides, such as sodium carbonate or sodium hydroxide. These free oil acids are part of the rancid reactions which produce bad odors. Soaps are produced from the neutralization reactions that are easily eliminated. In this way soy oil is obtained. It is assumed that this process does not need de-odorization or bleaching because it begins from a light raw material (with no undesirable odors or pigments)

A highly preferred organic solvent for the extraction of oil from soybeans should possess the following properties:

Good solubility of the oil.

Poor solubility of non-oil.

High volatility (i.e. low boiling point), so that complete removal of the solvent from the micella and the meal by evaporation is feasible and easy.

Yet, the boiling point should not be too low, so that extraction can be carried out at a somewhat high temperature to facilitate mass transfer.

Low viscosity.

Low latent heat of evaporation, so that less energy is needed for solvent recovery.

Low specific heat, so that less energy is needed for keeping the solvent ant the micella warm.

The solvent should be chemically inert to oil and other components of the soybean.

Absolute absence of toxicity and carcinogenicity, for the solvent and its residues.

Non-inflammable, non-explosive.

Non-corrosive.

Commercial availability in large quantities and low cost.

Preferably, solvents used are low-boiling hydrocarbon fractions obtained from petroleum. Generally, solvent having a boiling point range of less than 90° C. are preferred. A typical commercial solvent for oil extraction which may be used has a boiling point range (distillation range) of 65 to 70° C. and contains mainly of six-carbon alkanes, hence the name "hexane" by which these solvents are commonly known. "Hexane" solvents for the extraction of edible oil must comply with strict quality specifications. The quality parameters which make up the specifications usually include: boiling (distillation) range, maximum non-volatile residue, flash point, maximum sulphur, maximum cyclic hydrocarbons, color and specific gravity.

Generally, any lower alkyl, i.e. up to about 15, preferably up to about 12 carbons, hydrocarbons may be used as the extracting solvent to form a phase separation. For example, in addition to the preferred hexanes, mineral oils may be used.

Further, a temperature in the range of about 40° F. to about 90° F. is used for the extraction. Preferably, a temperature in the range of about 50° F. to 80° F. is used.

Safety considerations, of course, mandate use of special standards for buildings and installations in solvent extraction plants. All the electrical installations must be explosion-proof. The discharge end of all vents must be equipped with refrigerated condensers to minimize escape of solvent vapors to the atmosphere. Very strict safety measures must also be taken to prevent the hazard of sparks in and around the plant. All these add to the high cost of erection and operation of solvent extraction plants.

Thereafter, the oils are isolated by phase separation, and concentrated by distillation to remove all traces of organic solvent, which, of course, will have a much lower boiling point than the oil.

Finally, the distilled oil may be subjected to a conventional vacuum or reduced pressure treatment in order to further remove even trace amounts of solvent.

Generally, the same procedures may be used for the washing of seeds as with soybeans. Notably, the seeds, which are preferably dehulled in a conventional manner, are contacted with deaerated water under an atmosphere of sublimated carbon dioxide in orders to extract seed oils therefrom.

The seeds are then discarded, and the bath water containing the seed oil is subjected to extraction with organic solvent.

Generally, the bath water is contacted with an amount of extracting solvent which is from about 0.25 to 5× volume of the bath water. Preferably, the amount is from 0.75 to 2× the volume of the bath water.

Thereafter, the organic solvent phase is removed with the seed oil by phase separation in a conventional manner. Then, the organic phase may be dried with a desiccant to remove traces of water. Thereafter, the solvent is removed y partial vacuum evaporation, such as with a rotary evaporator. Thereafter, the isolated seed oil is obtained.

Having described the present invention, it will be apparent that many changes and modification may be made to the above-described embodiments without departing from the spirit and the scope of the present invention.

What is claimed is:

1. A process for preparing a beanless flavor soymilk or okara or a combination thereof, which comprises the steps of:
    a) contacting whole soybeans with deaerated water under an atmosphere of sublimated carbon dioxide for a time, a temperature and a pressure effective to allow said soybeans to soak and swell; and extract beany odors and flavors from the whole soybeans whereby said sublimated carbon dioxide promotes dissolution of proteolytic enzymes and retards enzymatic processes which contribute to poor flavor;
    b) washing said soaked and swollen soybeans with water to remove oligosaccharides and ripening enzymes;
    c) grinding said washed soybeans under an at atmosphere of sublimated carbon dioxide to form a slurry; and
    d) filtering the slurry to produce raw okara and soymilk.

2. The process of claim 1, wherein said soymilk contains no fiber.

3. The process of claim 1, which further comprises after step d), purifying said raw soymilk.

4. The process of claim 1, wherein the pH of the deaerated water for soaking in step a) is less than about 5.8.

5. The process of claim 4, wherein said pH is greater than about 4.6.

6. The process of claim 1, wherein said grinding step c) is effected with a minimum flux ration of about 0.15.

7. The process of claim 3, wherein said purifying steps after step d) is effected with a minimum flux ration of 0.043.

8. The process of claim 3, wherein said carbon dioxide is recycled through soaking, grinding, and purifying steps with a loop cycle.

9. The process of claim 8, wherein said carbon dioxide is obtained from solid carbon dioxide, and is at a maximum pressure of 10 bar absolute and a minimum temperature of −78° C. as sublimated gas.

10. The process of claim 1, wherein said raw soymilk is produces in a yield of at least 73.14% based on the usable soybean or at least 65% based on the whole soybean.

11. The process of claim 1, wherein the soymilk is low fat.

12. The process of claim 1, which is effected without heating whereby protein denaturation is avoided.

13. The process of claim 1, which is effected without vacuum deodorization.

14. The process of claim 1, which does not use chemical additives which leave inorganic acids or organic acids other than carbonic acid in the medium.

15. A process of extracting beany flavors or odors or both from whole soybeans, which comprises the step of contacting whole soybeans with deaerated water under an atmosphere of sublimated carbon dioxide for a time, a temperature and a pressure effective to extract the beany odors or flavors or both from the whole soybeans; whereby said sublimated carbon dioxide promotes dissolution of protolytic enzymes and retards enzymatic processes which contribute to poor flavor.

16. The process of claim 15, wherein the pH of the deaerated water is less than about 5.8.

17. The process of claim 16, wherein the pH is greater than about 4.6.

18. The process of claim 15, which is effected without heating whereby protein denaturation is avoided.

19. The process of claim 15, which is effected without vacuum deodorization.

20. The process of claim 1, wherein the deaerated water has a temperature of about 0 to 10° C.

21. The process of claim 15, wherein the deaerated water has a temperature of about 0 to 10° C.

* * * * *